Oct. 23, 1945.  C. L. KUBISTA  2,387,664
FOUNT FOR POULTRY AND OTHER DOMESTIC ANIMALS
Filed Aug. 25, 1943
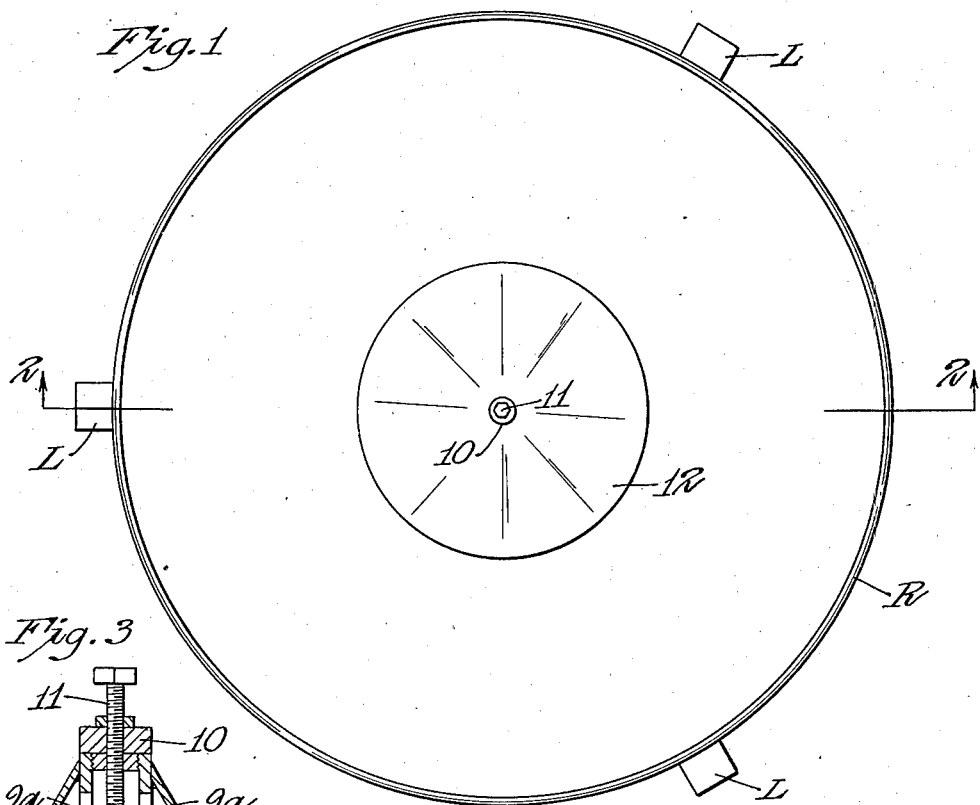
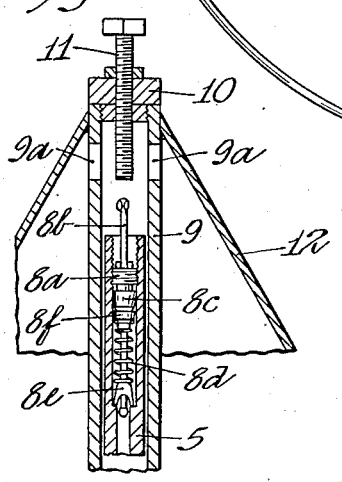
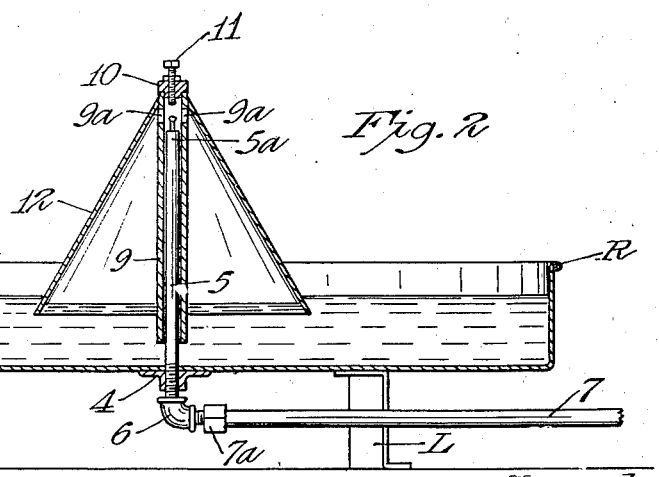
Inventor
Charles L. Kubista
By Williamson & Williamson
Attorneys Patented Oct. 23, 1945

2,387,664

UNITED STATES PATENT OFFICE 2,387,664

FOUNT FOR POULTRY AND OTHER DOMESTIC ANIMALS

Charles L. Kubista, Owatonna, Minn.

Application August 25, 1943, Serial No. 499,922

3 Claims. (Cl. 119—80)

This invention relates to founts for supplying water or other liquid to poultry, live stock and other domestic animals.

Heretofore, such founts or watering devices have most generally employed a float actuated discharge valve operating on a tilting or swinging plan and usually connected with a float arm which is susceptible to breakage, bending or maladjustment if struck by the domestic animal.

Such prior art devices for the most part have had exposed valve mechanism and discharges which often became clogged through refuse or dirt and which during the discharge of liquid often sprayed or sprinkled liquid outside of the collection receptacle and often upon the heads or bodies of the chickens or other domestic animals drinking.

It is an object of my present invention to provide a simple, highly efficient and inexpensive fount for poultry, live stock and other domestic animals which comprises a minimum number of parts and wherein the discharge of water or other liquid is accurately controlled by float actuated mechanism wherein all parts of the valve are covered and protected and wherein splashing or spraying of liquid is positively prevented.

It is a further object of my invention to provide an improved and simplified fount wherein the operating parts cannot become disaligned or maladjusted through use or striking by the heads of the animals and wherein the discharge valve is opened by vertical sliding movement of a weighted member and is closed through a simple float action which lifts the weighted member to release the normally closed valve when the level of liquid in the receptacle has attained a predetermined height.

More specifically it is an object to provide a float actuated fount of the type described wherein an upwardly extending discharge conduit has slidably mounted thereon a float carrying weight member having an element for engaging, depressing and opening a simple valve in the discharge of the conduit and wherein the float member serves the dual function of lifting the weight member from engagement with the valve when a pre-determined level of liquid is obtained and also completely covering and protecting the discharge of the conduit as well as the valve mechanism and also deflecting downwardly all liquid discharged from the conduit.

These and other objects and advantages of the invention will more fully appear from the following description made in connection with the accompanying drawing, wherein like reference characters refer to the same parts throughout the views, and, in which:

Fig. 1 is a plan view of an embodiment of the invention designed for watering poultry;

Fig. 2 is a vertical section taken on the line 2—2 of Fig. 1; and

Fig. 3 is a similar vertical section taken axially through the load equipped weight member and the discharge end and valve of the upwardly extending liquid conduit.

In the form of the invention illustrated a shallow pan receptacle R is provided of circular shape supported, as shown, above a floor or supporting surface by a series of short legs L having inwardly extending flanges welded or otherwise connected with the bottom of the receptacle R and having outturned supporting feet.

Extending upwardly through the bottom of the receptacle R and, as shown, rigidly secured to said bottom by an internally threaded heavy collar 4 is provided a vertical discharge conduit 5, as shown, disposed concentrically of the receptacle R, and terminating in an open upper discharge end 5a which is disposed some distance above the bottom of the receptacle. The lower end of conduit 5 may be externally threaded for threaded anchoring in the collar 4 and the joint between conduit 5 and the bottom of the receptacle is, of course, suitably sealed. An elbow fitting 6 is connected with the lower depending end of conduit 5 and has a threaded fitting for connection with the coupling member 7a of a flexible supply conduit 7. Supply conduit 7 has an adaptor fitting or coupling member (not shown) for connection with the faucet or other discharge member of a pressure source of water or other liquid supply such as a water system, or if desired the faucet of a liquid reservoir such as a barrel or tank.

Within the upper end of conduit 5 a discharge valve mechanism is mounted preferably of a sliding or poppet type wherein the valved passage is normally closed by pressure of the liquid from the source with or without the assistance of spring means, and wherein a stem or other projecting element is provided for depressing and opening the valve to permit discharge of liquid. Although a wide variety of vertically slidable valves are thoroughly practical and all within the scope of my invention, I prefer for convenience in manufacture to utilize the conventional tire valve mechanism, the valve "insides" of which can readily be obtained on the open market. Thus, as shown, the discharge end of the conduit 5 is internally threaded to receive the conventional valve anchoring and valve seating member 8a which also acts to guide the valve stem 8b upon which the small conventional valve member 8c is mounted and normally held in closed and seated position against the bottom of the member 8a by the conventional coil spring 8d which surrounds the lower part of valve stem 8b and is interposed between the conventional abutment collar 8e and a collar and seat member 8f mounted on the valve stem 8b just below the valve body 8c. The stem 8b of the described valve mechanism extends in conventional manner upwardly above the discharge end of conduit 5 to facilitate downward retraction and opening of the valve when the stem is depressed.

I provide a weighted member in the form of a sleeve 9 which may be conveniently constructed from a short piece of metal pipe and which is of an internal diameter to loosely encircle the cylindrical conduit 5, and which preferably has a smooth circular exterior to permit vertical sliding movement of the sleeve upon the conduit. In the upper portion of weight sleeve 9 a plurality of lateral discharge openings 9a are formed. The top of sleeve 9 is closed by suitable means such as a plug member 10 having screw threaded axially therein a depending adjustment screw 11 which, when the sleeve is operatively mounted on conduit 5, is axially aligned with the upper end of the valve stem 8b and engages the same when the receptacle is empty to open the valve and cause discharge of water.

A combination deflection skirt and open float member 12 is connected with the upper end of the weight sleeve 9, as shown, being of inverted funnel shape with the edge of its skirt disposed in a horizontal plane and having its upper end restricted and soldered, welded or otherwise secured with sealing effect to the upper end of sleeve 9, said float preferably extending concentrically of sleeve 9 and conduit 5 and completely shielding and encircling the discharge valve mechanism for almost the entire length of conduit 5.

In operation the flexible supply conduit 7 of my device is connected with the discharge faucet of a tank, barrel or pressure water or liquid system, and the faucet opened causes water to flow upwardly through discharge conduit 5a, the sleeve weight at such time with the pan empty depressing valve stem 8b and thus opening the valve to discharge liquid upwardly from the upper end of conduit 5. The discharged liquid passes downwardly between conduit 5 and the interior of sleeve 9 being deflected by the sleeve which forms the skirt and thus the discharge cannot spray or splash outwardly but is directed to the bottom of the receptacle. If desired several apertures 9a may be formed in the upper portion of the weight sleeve 9, in the event the device is used where considerable quantities of water may be sprayed, in order that the water may more quickly be discharged to the bottom of the receptacle.

When the water level in receptacle R obtains a predetermined height the edge of float skirt 12 is covered by the level of liquid and a barometric seal is formed, the entrapped air within float 12 thereby causing the float to rise with the accumulating volume of liquid in the receptacle and to lift said sleeve 9 until the valve stem 8b is released and the upward pressure of water through conduit 5 with the help of the small coil spring 8d closing the valve mechanism by engagement of the valve body 8c with its seat whereupon discharge of water is stopped and the level of water within receptacle R remains at a desired predetermined height until the chickens or other domestic animals lower the level somewhat by drinking or otherwise utilizing the liquid. Thereupon the upper end of weight sleeve 9 and more particularly the lower end of adjustment screw 11 again depresses valve stem 8b causing liquid to again be discharged until the pre-determined level is attained.

By threadedly adjusting the screw 11 it will be seen that the pre-determined level of liquid within receptacle R may be varied within a range of limits. It will further be seen that if desired and preferably the sleeve 9 may be made of such length and so related with the conduit 5 that the weight of said sleeve and float cone 12 is supported from the bottom of the receptacle until the level of water accumulated is up to a height within an inch or so of the pre-determined maximum level.

It will further be seen that the discharge for the liquid including the upper end of discharge conduit 5 and the lateral apertures 9a in the upper end of said sleeve 9, as well as the valve mechanism housed within discharge valve 5a are all completely covered and protected by the symmetrical and concentrically disposed conical float 12. It will further be seen that there are no swinging parts, levers or float arms which can become bent, maladjusted or disaligned in applicant's structure. The accidental striking of the float cone 12 by an animal drinking will in no way impair the efficiency or accuracy of the device.

It will further be understood that pans or receptacles of various shapes to suit the particular requirements may all be used within the scope of my invention.

It will further be understood that various changes may be made in the form, details, arrangement and proportions of the various parts without departing from the scope of my invention.

What I claim is:

1. A fount for poultry and domestic animals having in combination an open top receptacle for containing liquid, a rigidly mounted conduit extending vertically from the lower portion of said receptacle and terminating at its upper end at a point above the high liquid level of said receptacle and having means at its lower end for connection with a source of liquid supply, a normally closed, vertically reciprocable valve mounted in said conduit and having a stem projecting somewhat beyond the upper end of said conduit, a weighted tubular member slidably mounted upon said conduit and having a valve-operating element aligned with and spaced from but adapted to engage said projecting stem, a float member consisting only of an annular skirt connected with said weighted tubular member and surrounding the same and said conduit, said weighted tubular member having laterally extending apertures in the upper portion thereof for the discharge of liquid into the space between said weighted tubular member and said float member, and the float member deflecting downwardly the discharged liquid.

2. A fount for poultry and domestic animals having in combination an open top drinking receptacle, a rigidly mounted vertical conduit extending upwardly from the lower portion of said receptacle and terminating at a point above the high water level of said receptacle, means at the lower portion of said conduit for connection thereof with a source of liquid supply, a valve mechanism of the pneumatic tire type mounted in the upper portion of said conduit and having a valve-opening stem projecting above the upper end of said conduit, a float open at the bottom and closed at the top and sides and surrounding said conduit and extending above the upper end thereof and having vertical guiding means for slidably engaging said conduit exteriorly thereof and the upper end of said float having threadedly mounted therein an exteriorly operable adjustment screw axially aligned with said valve stem and spaced from said stem but capable of abutment at its lower end with said stem to depress the same and open said valve mechanism.

3. A fount for poultry and domestic animals having in combination, an open top drinking receptacle, a rigidly mounted, vertical conduit extending upwardly from the lower portion of said receptacle and terminating at a point above the high water level of said receptacle, a normally closed vertically reciprocable valve mounted in the upper portion of said conduit and having a stem projecting somewhat beyond the upper end of said conduit, a tubular weighted member loosely surrounding said conduit for vertical telescoping sliding movement thereon, a float comprising a hollow, open bottom member surrounding said tubular member throughout the major portion of the length of the same and connected only with the upper end thereof with sealed effect and an exteriorly operable valve opening element adjustably connected with the top of said float and said weighted member and having its lower end disposed in axial alignment with said valve stem and at times spaced from but adapted to abut and depress the same when the water is below a predetermined level in said receptacle.

CHARLES L. KUBISTA.